United States Patent [19]

Singh et al.

[11] Patent Number: 5,716,089
[45] Date of Patent: Feb. 10, 1998

[54] TIRE LOADER BASKET

[75] Inventors: Anand P. Singh; Xianzhen Liu, both of Akron, Ohio

[73] Assignee: McNeil & NRM, Inc., Akron, Ohio

[21] Appl. No.: 681,630

[22] Filed: Jul. 29, 1996

[51] Int. Cl.$^6$ ....................................... B66C 1/54
[52] U.S. Cl. .................. 294/93; 294/119.1; 294/88; 425/38
[58] Field of Search ................... 294/93–97, 88, 294/119.1; 425/36, 38; 269/32, 104, 107, 152, 225

[56] References Cited

U.S. PATENT DOCUMENTS

| | | | |
|---|---|---|---|
| 2,642,307 | 6/1953 | Olson | 294/88 |
| 3,167,810 | 2/1965 | Soderquist | 18/2 |
| 3,380,115 | 4/1968 | Soderquist | 18/2 |
| 3,564,649 | 2/1971 | Soderquist | 18/2 |
| 3,809,423 | 5/1974 | Gazuit | 294/93 |
| 3,924,983 | 12/1975 | Barton et al. | 425/38 |
| 4,092,090 | 5/1978 | Yuhas et al. | 425/28 |
| 4,169,698 | 10/1979 | Turk et al. | 425/28 |
| 4,170,442 | 10/1979 | Singh | 425/38 |
| 4,279,438 | 7/1981 | Singh | 294/88 |
| 4,338,069 | 7/1982 | Singh et al. | 425/38 |
| 4,447,385 | 5/1984 | Blosser et al. | 264/315 |
| 4,452,576 | 6/1984 | Sheerer et al. | 425/38 |
| 4,547,012 | 10/1985 | Krebs | 294/93 |
| 4,580,958 | 4/1986 | Crumbacher et al. | 425/38 |
| 4,597,729 | 7/1986 | Singh et al. | 425/38 |
| 4,608,219 | 8/1986 | Singh et al. | 264/315 |
| 4,618,320 | 10/1986 | Singh | 425/38 |
| 4,725,212 | 2/1988 | Singh | 425/38 |
| 5,395,150 | 3/1995 | Imler et al. | 294/93 |

*Primary Examiner*—Dean Kramer
*Attorney, Agent, or Firm*—Renner, Kenner, Greive, Bobak, Taylor & Weber

[57] ABSTRACT

A loader basket (20) for gripping, transporting, and precisely positioning a tire (T), including a framework (21) having a spider (30) with a plurality of radially extending arms (33), a plurality of shoes (40) mounted for radial movement on the arms, a spine plate (41) on each of the shoes for engaging the tire, an actuating assembly (60) for moving the shoes radially inwardly and outwardly on the arms, individually adjustable stop assemblies (70) on each of the arms limiting the extent of radially outward movement of each of the shoes, and a synchronizing mechanism (90) mechanically interconnecting the stop assemblies for uniformly simultaneously adjusting the extent of radial outward movement of each of the shoes.

20 Claims, 4 Drawing Sheets

TIRE LOADER BASKET

TECHNICAL FIELD

The present invention relates generally to apparatus for loading uncured tires into a tire curing press. More particularly, the present invention relates to a loader basket which is a portion of a loader assembly that operates to position uncured tires in a tire curing press preparatory to carrying out the tire vulcanization process. More specifically, the present invention relates to a loader basket which grips an uncured tire positioned on a stationary tire stand, maintains its engagement with the uncured tire while the loader assembly moves the loader basket from a position proximate the tire stand to a position proximate the lower mold cavity of a tire curing press, and releases the uncured tire at a precise position relative to the lower mold cavity preparatory to closure of the tire curing press and commencement of the tire vulcanization process.

BACKGROUND ART

Tire loading apparatus has been employed in conjunction with tire curing presses and other machinery for many years. Originally, tire loading apparatus was developed for purposes of automation to relieve the labor-intensive operations which had, for many years, characterized the production of pneumatic tires. Many different tire loaders evolved over the years with a variety of different structural features that were tailored, in part, to the operational parameters involved in a particular tire manufacturing installation, with the design being substantially controlled by the type of tire presses involved and the type of tire being produced. In the early years of automation, stress was placed upon achieving primarily automated loading apparatus which would reliably engage, hold, and disengage an uncured tire in a position wherein it could be operatively engaged by a tire press center mechanism in conjunction with the closing of the press and the carrying out of the tire vulcanization process therein.

Early tire loading apparatus employed in conjunction with tire curing presses did not place emphasis on positioning accuracy of the tire baskets of tire loading apparatus, as such was not deemed to be of particular importance, and center mechanisms were designed to carry out alignment functions to the extent such was deemed to be of importance by tire manufacturers. Variations in tire loading apparatus were thus frequently made to accommodate particular types of tire curing press center mechanisms and to accommodate particular tire configurations that evolved, such as a type of bias-ply tire which made it desirable to round out both bead areas of an uncured tire prior to the introduction of the uncured tire into the tire curing press.

Since the introduction and subsequent virtual universal acceptance of radial-ply tires, tire manufacturers have come to the realization over a period of time that accurate location of an uncured tire at the center of the lower mold cavity is essential to the production of a high-quality radial tire. It has thus become common for tire manufacturers to require repeat loading accuracy of uncured tires to precision on the order of several thousandths of an inch.

The precise positioning of an uncured tire with respect to the center of the lower mold cavity of a tire curing press involves two primary considerations. First, the tire loader itself, which consists of a movable arm or other member, must be capable of repeat precision movement for bringing a loader basket from a position where its centerline is aligned with a tire stand, tire holder, or conveyor position having an uncured tire located thereon, for picking up the uncured tire, and for transporting it to a position in precise alignment with the lower mold cavity of a tire curing press or other apparatus into which the uncured tire is to be deposited. Numerous loaders having various arrangements of pivoting arms are known in the art to provide accurate arcuate movement of a tire loader basket between two fixed positions. The present invention contemplates the utilization of a loader arm or other member capable of moving a tire loader basket between two spaced positions.

The second facet of precision loading involves the precise positioning of the shoes or tire-engaging members of the tire loader basket relative to the central axis of the loader basket. This requires that the loader shoes be radially independently adjustable relative to the central axis of the loader basket. A corollary to this requirement is the necessity that the shoes of the loader basket must remain in precise concentricity with the center axis of the loader basket over the entire range of radial adjustment of the shoes of the loader basket to accommodate a range of bead sizes for the different tire sizes that a tire curing press is constructed to accommodate for flexibility and economy of production. Thus, besides the necessity that the shoes of a tire loader basket move radially inwardly and outwardly to disengage and engage the upper bead of an uncured tire, it is additionally necessary that all of the shoes be capable of concentric radial adjustment to different positions to service the different tire bead sizes for which a tire loader is designed.

Prior-art tire loader baskets have been variously constructed to perform the functions of engaging and releasing an uncured tire and for radial adjustment to appropriately engage and disengage uncured tires having differing bead diameters. In some cases, oscillating actuating plates having a cam or scroll plate have been employed to actuate all shoes of a tire loader basket simultaneously. In other instances, individual cylinder actuators have been employed for each loader shoe of a loader basket. Various types of stops and adjustable rods have been employed for purposes of establishing the radially outer position of the shoes of a loader basket for each different tire bead size. The lack of initial setting precision, the lost motion in employing a plurality of interconnected components, and the tendency of some types of components to develop premature wear characteristics, all of which affect accuracy and cost, have precluded a broad-based adoption of any single tire loader basket configuration.

DISCLOSURE OF THE INVENTION

Therefore, an object of the present invention is to provide a loader basket for a tire curing press which permits an uncured tire to be located at the center of a lower mold cavity of a tire press with a high degree of accuracy. Another object of the present invention is to provide such a tire basket which is capable of repeatedly accurately positioning uncured tires in a tire press over any number of repeat operating cycles. A further object of the present invention is to provide such a loader basket which may be quickly and easily adjusted for use with tires of different bead sizes while positively maintaining the concentricity of the loader shoes of the loader basket over the entire adjustment range for bead size variations.

Another object of the present invention is to provide a loader basket for a loader for tire curing presses wherein the individual shoes of the loader basket require individual adjustment to achieve concentricity with respect to the centerline of the loader basket only a single time. A further object of the present invention is to provide such a loader basket wherein the stop mechanisms for radially positioning the shoes are positively rigidly interconnected, such that adjustment of the radial position of the shoes results in identical radial movement of all shoes. Yet another object of the present invention is to provide such a loader basket wherein a circular rack interengages the stop mechanism for each of the shoes to convert rotational movement of the circular rack into identical linear movement of all of the shoes radially of the centerline of the loader basket.

Another object of the present invention is to provide a loader basket for a loader for a tire curing press wherein the shoes are individually cylinder driven between the contracted and expanded positions to simplify the mechanism which would be required to drive all shoes with a single cylinder and to impart positive actuation and control of the expansion and contraction of the individual shoes. A further object of the present invention is to provide such a loader basket wherein the shoes are mounted for precise linear movement radially of the loader basket on angularly spaced spider arms. Still another object of the present invention is to provide such a loader basket wherein the shoes have a plurality of flanged rollers and cooperating eccentrically-mounted cam rollers permitting close tolerance orientation adjustment with respect to the spider arms.

Still another object of the present invention is to provide a loader basket for loaders for tire curing presses which can be adopted to a wide variety of tire curing presses extant in the industry due, in part, to its overall compact design. Yet another object of the present invention is to provide such a loader basket which can be quickly and easily installed on a loader, accurately initially adjusted for concentricity, and quickly and easily adjusted for producing different tire sizes in manufacturing operations. Still a further object of the invention is to provide such a loader basket which has a minimum of moving parts, resulting in low maintenance, while providing superior performance and accuracy at a reduced cost relative to most loader baskets currently marketed in the industry.

In general, the present invention contemplates loader basket for gripping, transporting, and precisely positioning a tire, including a framework having a spider with a plurality of radially extending arms, a plurality of shoes mounted for radial movement on the arms, a spine plate on each of the shoes for engaging the tire, an actuating assembly for moving the shoes radially inwardly and outwardly on the arms, individually adjustable stop assemblies on each of the arms limiting the extent of radially outward movement of each of the shoes, and a synchronizing mechanism mechanically interconnecting the stop assemblies for uniformly simultaneously adjusting the extent of radial outward movement of each of the shoes.

PREFERRED EMBODIMENT FOR CARRYING OUT THE INVENTION

Figure 1:
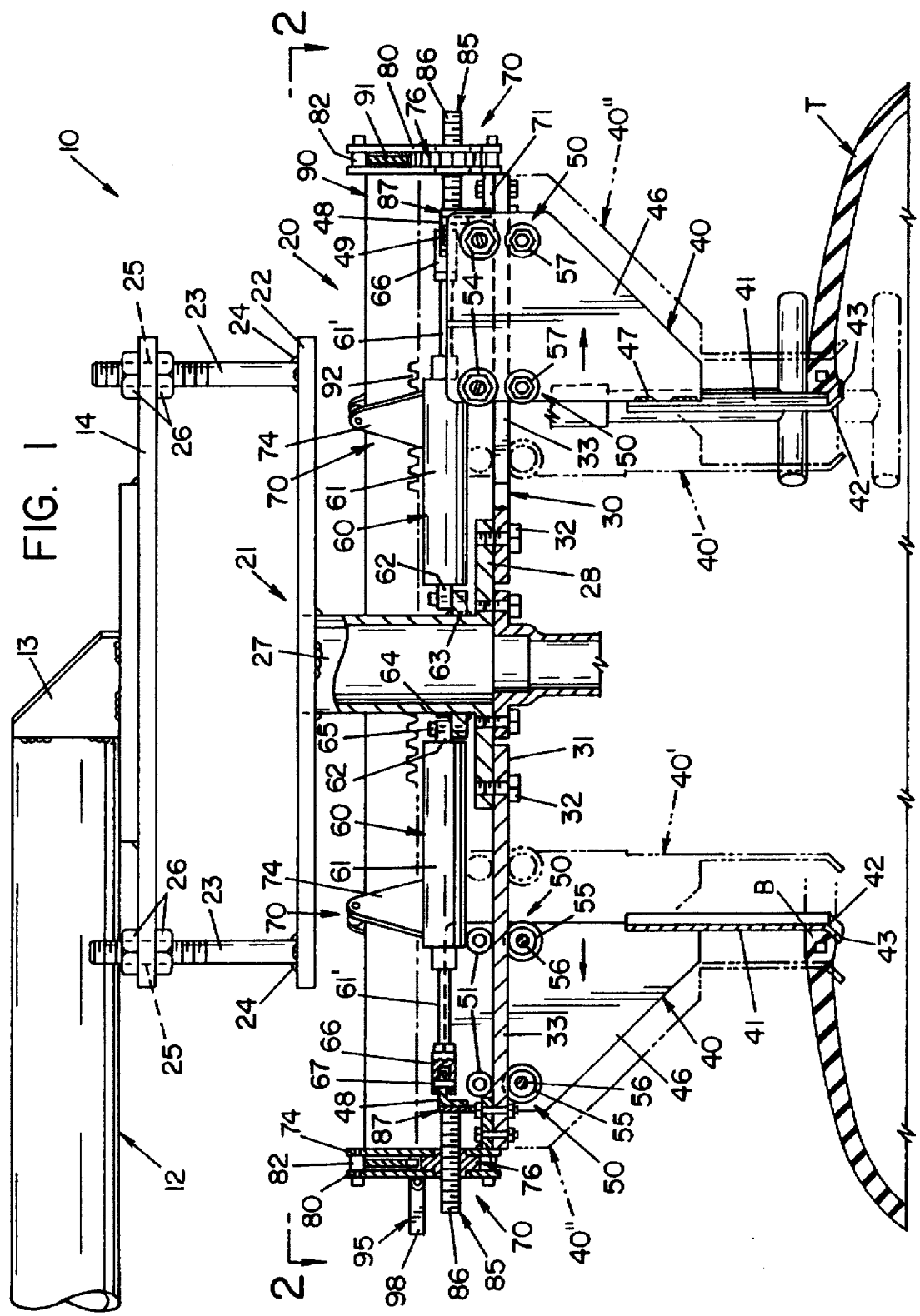
FIG. 1 is a vertical sectional view of an exemplary tire loader basket according to the concepts of the present invention shown in conjunction with a loader arm and supporting the upper bead of an exemplary radial-ply tire.
Figure 2:
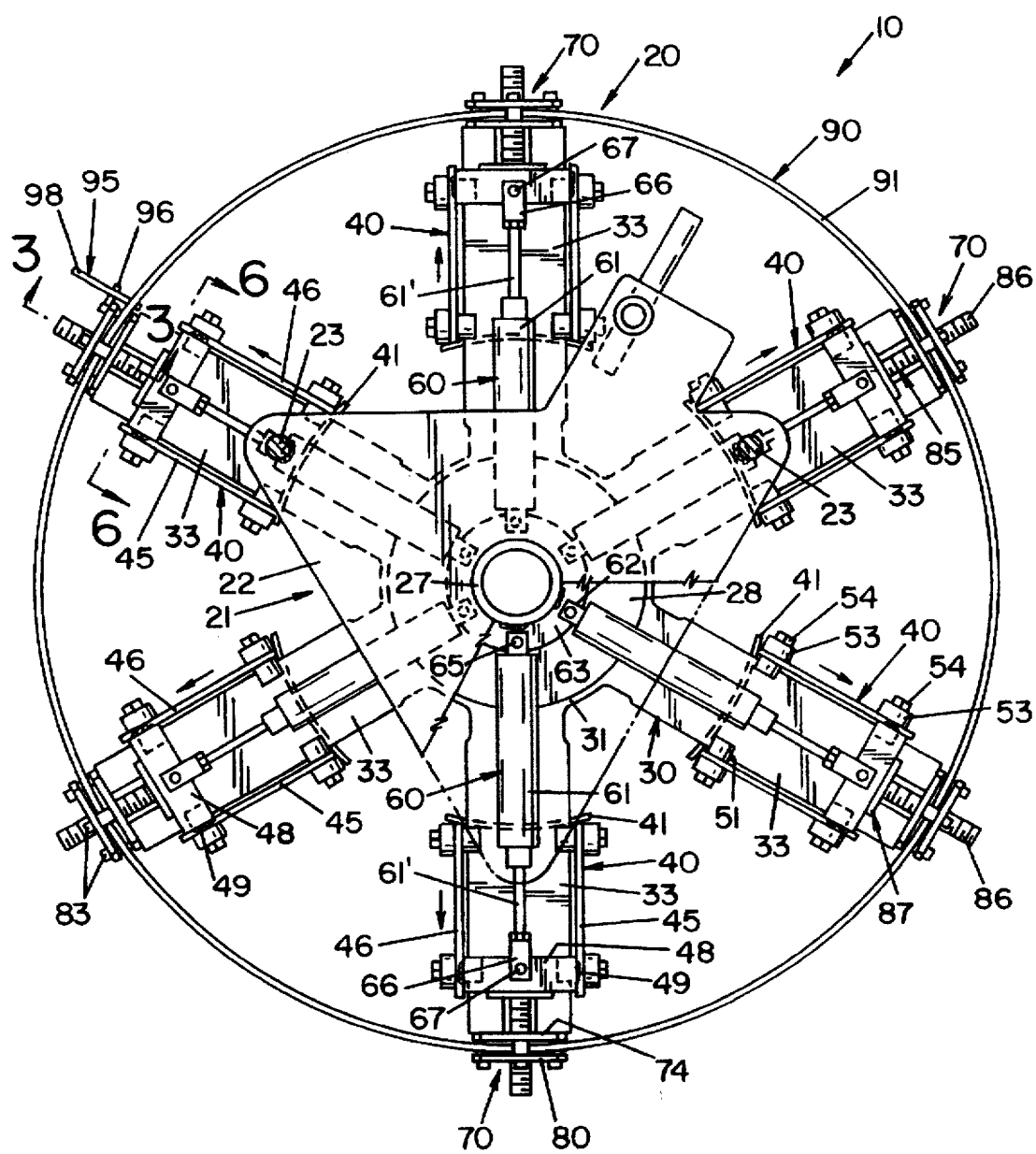
FIG. 2 is a top plan view of the tire loader basket of FIG. 1 taken substantially along the line 2—2 of FIG. 1 and showing the overall arrangement of the spider configuration.

A portion of a tire press loader embodying the concepts of the present invention is generally indicated by the numeral 10 in FIGS. 1 and 2 of the drawings. As shown in FIG. 1, the loader 10 includes a loader arm, generally indicated by the numeral 12, having a distal end 13 which carries a loader basket mounting plate 14. The loader arm 12 and loader basket mounting plate 14 are selectively vertically and horizontally movable in a conventional manner. In particular, the loader arm 12 is vertically downwardly movable to a position for picking up an uncured tire on a tire stand, holder, or conveyor, movable vertically upwardly to lift an uncured tire, pivotable through a horizontal angle into vertical alignment with the lower mold cavity of a tire curing press, movable vertically downwardly to position the uncured tire in the lower mold cavity, movable vertically upwardly after release of the uncured tire, and pivotable through a horizontal angle into alignment with the tire stand to complete the operating sequence, all being well known in the art. A swinging jib-type loader arm 12 is depicted for exemplary purposes in FIG. 1, which is normally vertically movable and rotatably mounted on a stanchion located to one side of the mold cavity of a press. It is to be appreciated that the loader frame may be of a type which is mounted to a press head to effect the horizontal motion component. In any instance, the loader basket mounting plate 14 is operative to normally move vertically and horizontally, as necessary, to pick up and re-position a tire in the lower mold section of a press as required for a particular press configuration on which a tire press loader 10 is to be operatively installed.

The loader basket mounting plate 14 suspends an exemplary loader basket assembly, generally indicated by the numeral 20, which is configured in accordance with the concepts of the present invention. The loader basket assembly 20 has as a primary structural component a basket assembly framework, generally indicated by the numeral 21. The basket assembly framework 21 includes a basket support plate 22 which, as best seen in FIG. 2, may be of a generally triangular configuration. The basket support plate 22 of basket assembly framework 21 is suspended from the loader basket mounting plate 14 by a plurality of rods 23, seen in both FIGS. 1 and 2. The rods 23 are attached to basket support plate 22 as by welds 24 and extend through apertures 25 in the loader basket mounting plate 14. As shown, the rods 23 are threaded over a substantial portion of their length, with each having a pair of locknuts 26 which are positioned to either side of loader basket mounting plate 14 to adjustably rigidly mount basket assembly framework 21 thereto. In this manner, basket support plate 22 may be positioned at any preselected spaced distance from loader basket mounting plate 14 and in selective relative parallelism thereto. Once appropriately adjusted, the locknuts 26 on each rod 23 are secured to maintain loader basket assembly 20 at a fixed position relative to the loader arm 12. This vertical adjustability of loader basket assembly 20 permits mounting on a variety of different presses and on different loader configurations.

The basket assembly framework 21 of loader basket assembly 20 includes a hub 27 which is attached to the underside of basket support plate 22 and projects downwardly perpendicular thereto. The hub 27 has a projecting flange 28 which may be positioned proximate the lower extremity thereof. Extending radially outwardly from the hub 27 preferably at the lower extremity thereof is a spider 30. As shown, the spider 30, as shown, the spider 30 has a central body portion 31 which may be attached to the hub 27 as by a plurality of cap screws 32 (FIG. 1). The spider 30 has a plurality of arms or guide bars 33 which extend radially outwardly from the central body portion 31 and are equiangularly circumferentially spaced relative to the hub 27, as best seen in FIG. 2. As shown, there are six guide bars 33 positioned at 60-degree angular increments relative to hub 27. The number of guide bars 33 could vary from approximately three to twelve, depending upon the size, configuration, and composition of uncured tires to be handled by loader basket assembly 20.

Each of the guide bars 33 of loader basket assembly 20 is interrelated with a tire T by virtue of loader shoe assemblies, generally indicated by the numeral 40. Inasmuch as the loader shoe assemblies 40 are identical in structure and operation, the following description is applicable to each of the six loader shoe assemblies 40 depicted in FIG. 2. As the member for engaging a tire T, the loader shoe assemblies 40 have a vertically-oriented spine plate 41 which may advantageously be slightly curved and of an appropriate arcuate extent, depending upon the number of loader shoe assemblies 40 and the size, construction, and composition of tires T to be handled by a loader basket assembly 20. The spine plates 41 have a bend 42 proximate their lower extremity that forms a lip 43 which is contoured to engage the upper bead B of uncured tire T. The lip 43 supports the beads B of tire T from sliding off of spine plate 41 without the necessity for applying severe radial outward forces to the bead B, which could cause damage or deformation of the bead area of a green tire.

Figure 6:
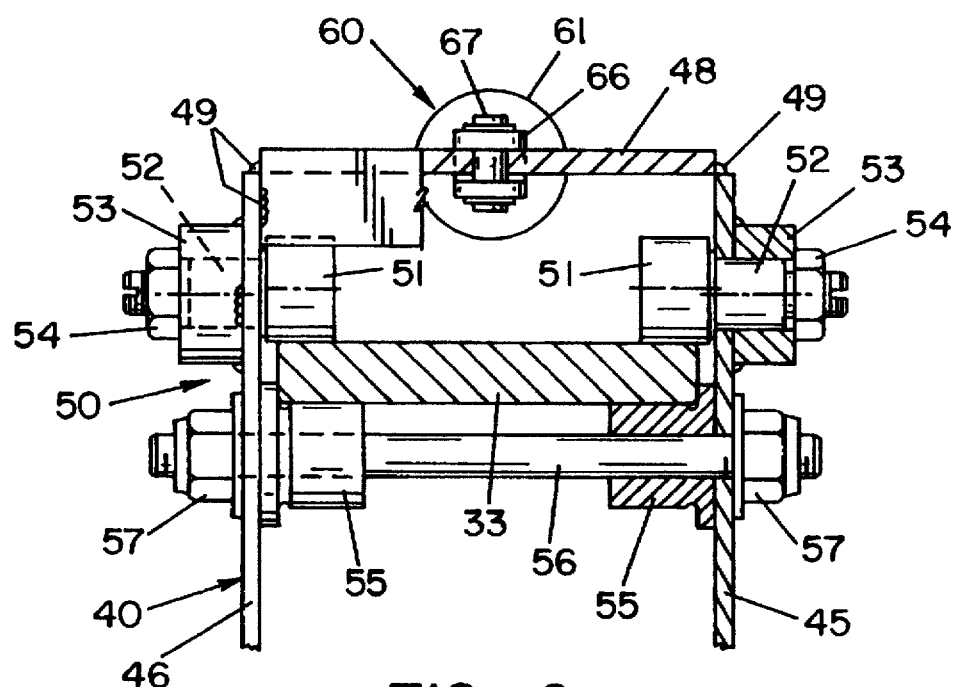
FIG. 6 is an enlarged vertical sectional view taken substantially along the line 6—6 of FIG. 2 showing particularly details of the rollers of the shoe assemblies in relation to the arms of the spider.

The loader shoe assemblies 40 include a pair of spaced parallel side plates 45 and 46 which support the spine plates 41 (FIGS. 1 and 2). As seen in FIG. 1, the spine plates 41 are connected to each of side plates 45, 46 as by welds 47 to thus rigidly space and join side plates 45 and 46. The side plates 45, 46 are also spaced and joined at a location displaced from spine plates 41 by an L-shaped drive plate 48 as by welds 49. As best seen in FIGS. 1 and 6, the side plates 45 and 46 are spaced a distance somewhat greater than the width of the rectangular guide bars 33 of the basket assembly framework 21. The loader shoe assemblies 40 interconnect with guide bars 33 of spider 30. In this respect, each set of side plates 45, 46 have vertically opposed roller sets, generally indicated by the numeral 50, at horizontally-spaced locations within the confines of side plates 45, 46. As all of the roller sets 50 are preferably identical, only the roller set 50 depicted in FIG. 6 of the drawings is described hereinafter in detail. The roller sets 50 consist of a pair of cam rollers 51 eccentrically mounted on studs 52 which extend through spacers 53, with the studs 52 being rotationally fixed by locknuts 54. It will be appreciated that the cam rollers 51 support loader shoe assemblies 40 on the upper horizontal surface of guide bars 33.

Roller sets 50 include a pair of flanged rollers 55 spaced a distance below cam rollers 51 mounted on a shaft 56 secured at either end thereof as by locknuts 57. It will be appreciated that the flanged rollers 55 of roller sets 50 maintain side plates 45, 46 of loader shoe assemblies 40 precisely positioned laterally of the guide bars 33. The studs 52 are rotationally adjusted to position the cam rollers 51 so as to provide optimum running clearance for cam rollers 51 along guide bars 33 without excess clearance, which would permit vertical movement of side plates 45, 46 relative to guide bars 33. In addition, the spaced positioning of two roller sets 50 on each of side plates 45, 46 permits minor vertical adjustment of cam rollers 51 so that spine plates 41 are precisely perpendicularly aligned with respect to guide bars 33, which promotes attaining precise concentric alignment of spine plates 41 relative to the hub 27 of basket assembly framework 21.

Each of the loader shoe assemblies 40 is radially moved along its respective guide bar 33 by an actuating assembly, generally indicated by the numeral 60, as seen in FIGS. 1 and 2. The actuation assemblies 60 each have as the drive element thereof a piston cylinder 61. A blind end connector 62 of each piston cylinder 61 is pivotally attached to a ring 63 affixed to stationary hub 27 as by welds 64 by a pin 65. As shown, the ring 63 is preferably positioned above spider 30 of basket assembly framework 21, with the blind end connectors 62 positioned circumferentially of hub 27 at locations substantially circumferentially medially of the guide bars 33 of spider 30. The rod end of each of the piston cylinders 61 carries a clevis 66 which is attached by a pin 67 extending through the drive plate 48 of the loader shoe assemblies 40 (see FIG. 6). It will thus be recognized that piston cylinders 61 at all times remain radially aligned with the guide bars 33 and impart radial forces to the loader shoe assemblies 40, which are precisely aligned with the direction of movement of loader shoe assemblies 40 along the guide bars 33. This orientation facilitates ease of movement of loader shoe assemblies 40, reduced binding of the roller sets 50 relative to guide bars 33, and enhanced wear characteristics of the rollers 51 and 55.

The extent of radial movement of the loader shoe assemblies 40 along guide bars 33 is controlled in part by the actuating assembly 60 for each loader shoe assembly 40. Specifically, the collapsed position of the loader shoe assemblies 40, which is indicated by the numeral 40' in FIG. 1, is the position of piston cylinders 61, with the piston rod 61' fully retracted. Since the collapsed position 40' of loader shoe assemblies 40 is employed to release an uncured tire T from the loader shoe assemblies 40 and to effect positioning prior to expansion to grip an uncured tire T, an accurate collapsed position 40' of loader shoe assemblies 40 is unnecessary, with it being necessary only to provide adequate clearance to permit free insertion and removal of loader shoe assemblies 40 in the collapsed position 40' relative to the upper bead B of an uncured tire T.

In contrast to the collapsed position 40' of loader shoe assemblies 40, the expanded position where the upper bead B of an uncured tire T is grasped by the spine plates 41 is of critical importance in engaging a bead B of an uncured tire T in a secure manner so that the uncured tire T is retained during movement of the loader basket assembly 20 while avoiding damage or unnecessary distortion of the bead B. In addition, concentricity of spine plates 41 relative to hub 27, or a location proximate to the centerline thereof, is required to effect a precise positioning of the uncured tire T in relation to the center of a lower mold cavity of a tire curing press.

Figure 3:
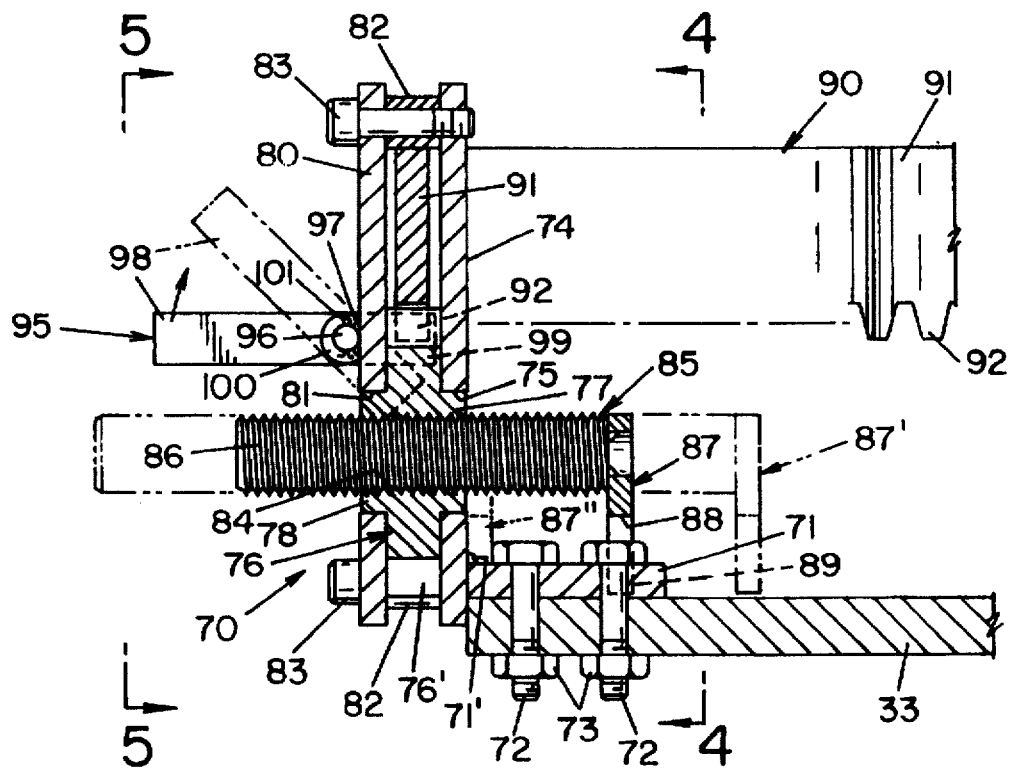
FIG. 3 is a fragmentary sectional view taken substantially along the line 3—3 of FIG. 2 showing details of a stop mechanism for a shoe assembly operative on a spider arm.

The precision positioning of loader shoe assemblies 40 in the expanded position is effected by loader shoe stop assemblies, generally indicated by the numeral 70, associated with each of the guide bars 33 and its respective loader shoe assembly 40. Since all of the loader shoe stop assemblies 70 may be identical, only a single stop assembly 70 is described in detail in relation to particularly FIGS. 1 and 3–5 of the drawings. The loader shoe stop assemblies 70 are mounted proximate the radial outer extremity of guide bars 33 by a mounting plate 71 detachably positioned by cap screws 72 and locknuts 73. Extending vertically upwardly of mounting plate 71 is a bracket 74 which may be generally triangular and which may be affixed to mounting plate 71 as by a weld 71'. The bracket 74 has a bore 75 which seats a spur gear 76 and particularly an extending axial hub 77 thereof. The spur gear 76 has a second axial hub 78 extending in a direction opposite to axial hub 77. A plate 80 which may have the same generally triangular configuration as the bracket 74 is positioned radially outwardly of the spur gear 76. The plate 80 has a bore 81 which receives the axial hub 78 of spur gear 76. It will thus be appreciated that the spur gear 76 is journaled on axial hubs 77 and 78 between the bracket 74 and the plate 80. As best seen in FIG. 3, the bracket 74 and plate 80 are spaced and joined in substantially upright parallel relationship by spur gear 76 and a spacer 82, together with three spaced fasteners such as cap screws 83. It will thus be appreciated that spur gear 76 is mounted for free rotation between bracket 74 and plate 80.

Figure 4:
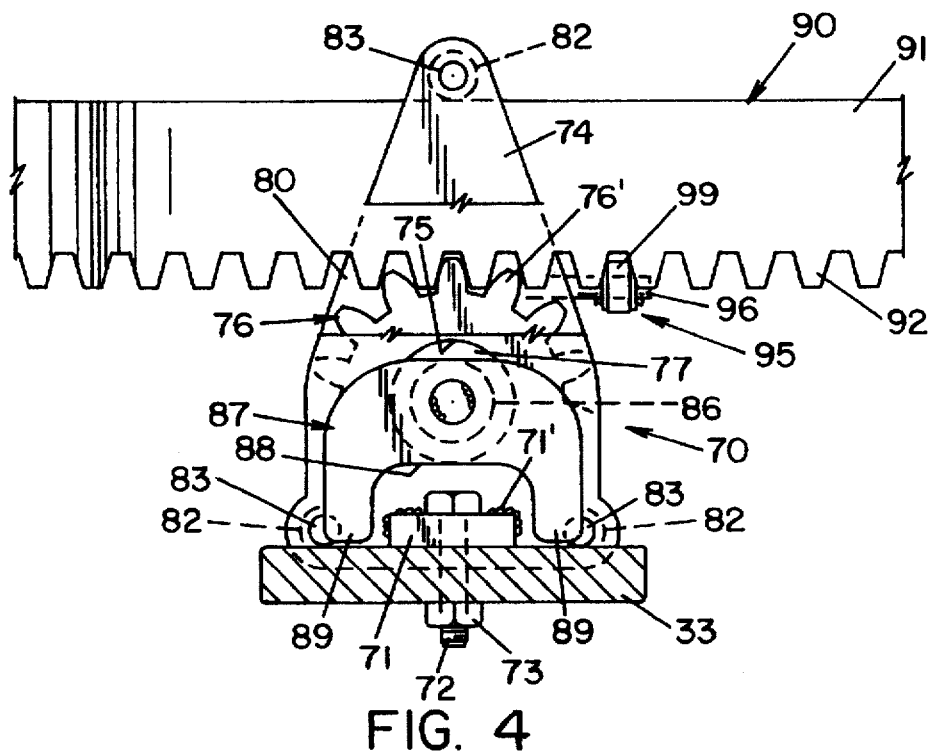
FIG. 4 is a fragmentary sectional view taken substantially along the line 4—4 of FIG. 3 showing particularly details of the interconnection between the rack and the stop mechanisms for each shoe assembly.
Figure 5:
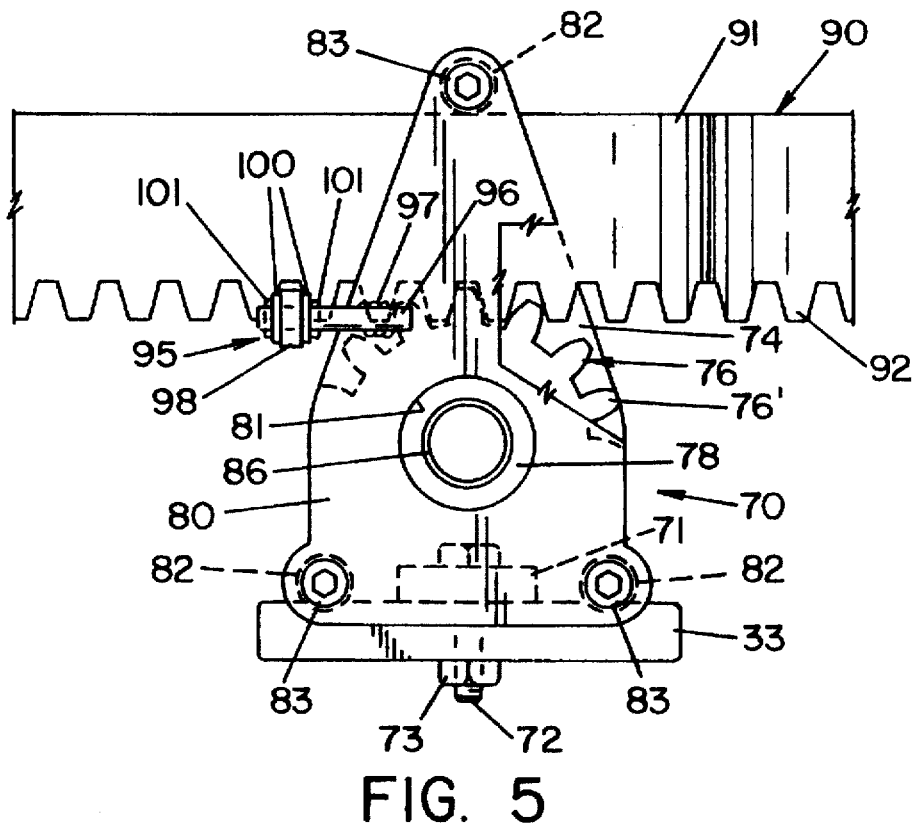
FIG. 5 is a fragmentary vertical sectional view taken substantially along the line 5—5 of FIG. 3 showing particularly details of a locking mechanism for maintaining the rack in a selected circumferential position relative to the stop mechanisms for each shoe assembly.

The spur gear 76 has a threaded central bore 84 for receiving a stopper 85 which projects radially inwardly and outwardly thereof. The stopper 85 has a threaded shaft 86 which is adapted to operatively interengage with the threaded central bore 84 of spur gear 76. It will thus be appreciated that rotational motion of spur gear 76 results in linear motion of stopper 85 radially inwardly and outwardly relative to the guide bars 33. The stopper 85 has at the radially inner end of threaded shaft 86 a vertically extending stop plate 87 which is attached thereto as by a weld which moves stop plate 87 linearly relative to guide bars 33 with shaft 86. As best seen in FIG. 4, the stop plate 87 may have a generally inverted U-shape to provide a substantial vertical engaging surface while being provided with a cut-out 88 which precludes interfering contact of stop plate 87 with mounting plate 71 and the cap screws therefor. The stop plate 87 may have downward depending legs 89 which may be of an extent to engage the upper surface of guide bars 33 to stabilize stopper 85, particularly when stop plate 87 is positioned proximate its radially innermost position, as depicted at 87' in FIG. 3. It will be appreciated that stop plate 87 has a substantial extent of adjustability along guide bars 33 from the radially innermost position 87' to the radially outermost position 87" where stop plate 87 is substantially in engagement with the bracket 74 (FIG. 3). This latter radially outermost position 87" of stop plate 87 places side plates 45, 46 and spine plates 41 in the position depicted as 40" in FIG. 1. It is to be appreciated that wherever stop plate 87 is positioned, actuation of a piston cylinder 61 moves a loader shoe assembly 40 radially outwardly until such time as the vertical leg of drive plate 48 engages stop plate 87.

It will be appreciated that the loader shoe stop assemblies 70 can be readily individually positioned radially of guide bars 33 for precise concentricity and engagement with the bead B of an uncured tire T merely by rotating spur gears 76 to move threaded shafts 86 to position the respective stop plates 87 for requisite positioning of the spine plates 41. Once thus precisely located for a given tire size, the loader shoe stop assemblies 70 for each of the loader shoe assemblies 40 may be positively mechanically interconnected by the circular rack synchronizing mechanism 90. As seen in FIGS. 1–5, the circular rack synchronizing mechanism 90 consists of an annular band 91 having a diameter which permits its positioning between the bracket 74 and the plate 80 of each of the loader shoe stop assemblies 70, as best seen in FIG. 2. The lower edge of annular band 91 is provided with circumferential teeth 92 about the entire circumference thereof which are cut to matingly engage the teeth 76' of the spur gears 76 of each of the loader shoe stop assemblies 70.

Once each of the stop plates 87 is precisely adjusted for a particular tire size, the upper cap screw 83 and spacer 82 of each loader shoe stop assembly 70 are removed, and the detachable annular band 91 is positioned between the brackets 74 and plates 80, such that the teeth 92 of annular band 91 engage the teeth 76' of the spur gears 76. Thus, the loader shoe stop assemblies 70 are all mechanically interlocked. Thereafter, angular movement of annular band 91 will produce identical movement of all of the stop plates 87, thereby determining the radially outward position for each of the loader shoe assemblies 40. In this manner, adjustment solely of annular band 91 simultaneously effects precise equivalent adjustment of all loader shoe assemblies 40 to achieve identical radially outward positioning of the spine plates 41. As a result, adjustment of the loader shoe stop assemblies 70 for different tire sizes can be quickly and precisely effected. In addition, indicia may be provided on annular band 91 to effect repeat positioning of the loader shoe assemblies 40 for specific tire sizes. Once proper positioning is effected and tested, the spacers 82 and cap screws 83 of each loader shoe stop assembly 70 may be replaced to thereby lock annular band 91 in a given position in engagement with spur gear 76 of each loader shoe stop assembly 70 until such time as adjustment or part replacement might be required.

In order to preclude angular movement of circular rack synchronizing mechanism 90 during operation of tire press loader 10 on a particular tire size, one of the loader shoe stop assemblies 70 may be provided with a rack locking mechanism, generally indicated by the numeral 95. The rack locking mechanism 95 consists of a pivot pin 96 which may be attached as by welds 97 to the radially outer surface of a plate 80 of one of the loader shoe stop assemblies 70. The pivot pin 96 carries a pivotal bar latch 98 having a catch end 99 (FIG. 4) adapted to interengage the teeth 92 of annular band 91 of circular rack synchronizing mechanism 90. The pivotal bar latch 98 may be positioned axially along pivot pin 96 by washers 100 and cotter keys 101. As can be appreciated particularly from FIGS. 3–5, inclusive, the pivotal bar latch 98 may be manually located in the chain line position of FIG. 3, while the circular rack synchronizing mechanism 90 is angularly actuated to alter the radial position of the stop plates 87 of the loader shoe stop assemblies 70. Once appropriately positioned, release of pivotal bar latch 98 results in gravity-actuated pivotal displacement of pivotal bar latch 98 to the solid line position depicted in FIG. 3, wherein the catch end 99 is interengaged with the teeth 92 of annular band 91.

Thus, it should be evident that the tire loader basket disclosed herein carries out various of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention being limited solely by the scope of the attached claims.

We claim:

1. A loader basket for gripping, transporting, and precisely positioning a tire comprising, a framework having a spider with a plurality of radially extending arms, a plurality of shoes mounted for radial movement on said arms, a spine plate on each of said shoes for engaging the tire, an actuating assembly for moving said shoes radially inwardly and outwardly on said arms, individually adjustable stop assemblies mounted on each of said arms limiting the extent of radially outward movement of each of said shoes, and a synchronizing mechanism mechanically interconnecting said stop assemblies for uniformly simultaneously adjusting the extent of radial outward movement of each of said shoes.

2. A loader basket for gripping, transporting, and precisely positioning a tire comprising, a framework having a spider with a plurality of radially extending arms, a plurality of shoes mounted for radial movement on said arms, a spine plate on each of said shoes for engaging the tire, an actuating assembly for moving said shoes radially inwardly and outwardly on said arms, individually adjustable stop assemblies on each of said arms limiting the extent of radially outward movement of each of said shoes, and a synchronizing mechanism mechanically interconnecting said stop assemblies for uniformly simultaneously adjusting the extent of radial outward movement of each of said shoes, said synchronizing mechanism being a circular rack.

3. A loader basket for gripping, transporting, and precisely positioning a tire comprising, a framework having a spider with a plurality of radially extending arms, a plurality of shoes mounted for radial movement on said arms, a spine plate on each of said shoes for engaging the tire, an actuating assembly for moving said shoes radially inwardly and outwardly on said arms, individually adjustable stop assemblies on each of said arms limiting the extent of radially outward movement of each of said shoes, and a synchronizing mechanism mechanically interconnecting said stop assemblies for uniformly simultaneously adjusting the extent of radial outward movement of each of said shoes, said stop assemblies mounting stoppers having threaded shafts moving stop plates radially inwardly and outwardly to limit the extent of radial outward movement of said shoes.

4. A loader basket as set forth in claim 3, wherein said stop assemblies include spur gears which operatively interengage said threaded shafts of said stoppers and said synchronizing mechanism is an annular rack having teeth for simultaneously engaging all of said spur gears.

5. A loader basket as set forth in claim 4, wherein said annular rack is manually angularly movable to effect equal and simultaneous radial movement of all of said stoppers.

6. A loader basket as set forth in claim 4, wherein said spur gears have threaded bores for engaging the threaded shafts of said stoppers.

7. A loader basket as set forth in claim 6, wherein said spur gears have axial hubs supported by brackets and plates mounted proximate the radial extremity of each of said arms.

8. A loader basket as set forth in claim 7, wherein said annular rack is detachably mounted between said brackets and said plates in mating engagement with said spur gears.

9. A basket for precision gripping and releasing of a tire comprising, a framework having a spider with a plurality of radially extending guide bars, said guide bars being substantially rectangular in cross section, shoe assemblies having spine plates for engaging the tire mounted for radial movement along said guide bars, a pair of roller sets mounted on each of said shoe assemblies, each of said roller sets including an adjustable eccentric cam roller supporting said shoe assemblies for orientation relative to and for movement on said guide bars, whereby said spine plates can be adjusted for perpendicularity relative to said guide bars, and actuating assemblies for moving said shoe assemblies radially inwardly and outwardly on said guide bars.

10. A basket for precision gripping and releasing of a tire as set forth in claim 9, wherein each of said roller sets has a pair of axially-spaced eccentric cam rollers supporting said shoe assemblies.

11. A basket for precision gripping and releasing a tire as set forth in claim 10, wherein each of said roller sets have said eccentric cam rollers disposed above said guide bars and a pair of flanged rollers disposed below said guide bars to maintain said shoe assemblies in lateral alignment relative to said guide bars.

12. A basket for precision gripping and releasing a tire as set forth in claim 11, wherein said shoe assemblies have spaced parallel side plates mounting said roller sets.

13. A basket for precision gripping and releasing a tire as set forth in claim 12, wherein said side plates are spaced a distance slightly greater than the lateral width of said guide bars.

14. A basket for precision gripping and releasing a tire as set forth in claim 12, wherein said pair of roller sets are mounted on said shoe assemblies at substantially radially spaced locations.

15. A basket for precision gripping and releasing a tire as set forth in claim 12, wherein spine plates are attached to said side plates and a drive plate to which said actuating assembly is connected to space and join said side plates.

16. A basket for precision gripping and releasing a tire as set forth in claim 14, wherein said locking mechanism includes a pivotal bar latch which is movable to position a catch to engage said teeth on said rack.

17. A basket for precision gripping and releasing a tire as set forth in claim 9, wherein said actuating assemblies include a piston cylinder assembly located substantially medially of and aligned with said guide bars for imparting radial forces to said shoe assemblies.

18. A basket for precision gripping and releasing of a tire comprising, a framework, a plurality of tire engaging shoes mounted on said framework for substantially radial movement, a piston cylinder assembly attached to each of said tire engaging shoes and to said framework for selectively moving said tire engaging shoes radially inwardly and outwardly, stop assemblies associated with each of said tire engaging shoes and mounted on said framework, a stopper in each of said stop assemblies independently adjustable to limit the radially outward movement of the associated tire engaging shoe, and a continuous rack selectively mechanically interconnecting all of said stop assemblies for effecting equal radial movements of said stoppers in each of said stop assemblies.

19. A basket for precision gripping and releasing a tire as set forth in claim 18, wherein said stop assemblies include a spur gear operating said stopper and engaging teeth on said continuous rack.

20. A basket for precision gripping and releasing a tire as set forth in claim 19, wherein one of said stop assemblies mounts a locking mechanism selectively operative to engage said teeth on said rack to prevent rotation of said rack.

* * * * *